Patented Nov. 6, 1928.

1,690,647

UNITED STATES PATENT OFFICE.

WALTER MINNICH, OF MONTREUX, SWITZERLAND, ASSIGNOR TO SOCIETY OF CHEMICAL INDUSTRY IN BASLE, OF BASEL, SWITZERLAND.

ESTERS OF CHOLESTEROL WITH UNSATURATED ACIDS.

No Drawing. Application filed November 10, 1924, Serial No. 749,045, and in Switzerland November 19, 1923.

The invention relates to the preparation of new esters of cholesterol with unsaturated organic acids.

I have found that highly therapeutically active esters of unsaturated acids can be obtained by esterifying acids of the general formula: R.COOH wherein R stands for an aliphatic or aliphatic-aromatic hydrocarbon-radical carrying at least one treble linkage. As an example of such an acid there may be named phenylpropiolic acid.

Instead of the acids themselves also their derivatives, such as halides or anhydrides, may be condensed with cholesterol; on the other hand, instead of cholesterol itself, also its halides may be brought to reaction with the above named acids.

*Example.*

77.2 parts by weight of cholesterol are dissolved with aid of heat in 50 parts of dry xylene. The solution is mixed with one of 34 parts of phenylpropiolic acid chloride in 50 parts of xylene and the whole is cautiously heated in a reflux apparatus until evolution of hydrogen chloride ceases. The reaction mixture, while still hot, is mixed with 500 parts of alcohol and the ester thus precipitated is filtered and recrystallized from ethyl acetate. It forms a white, crystalline powder, very sparingly soluble in alcohol and more freely soluble in ethylacetate, benzene, etc. The ester softens at 148° C. and melts at 153.5° C. while yielding iridescent colors.

What I claim is:

As articles of manufacture useful in theropeutics the herein described esters of cholesterol with unsaturated acids of the general formula: R.COOH wherein R stands for an aliphatic or aliphatic-aromatic hydrocarbon radical carrying at least one treble linkage.

In witness whereof I have hereunto signed my name this 27th day of October, 1924.

WALTER MINNICH.